Feb. 6, 1940.  J. J. COYNE  2,189,708
VIBRATION ISOLATOR
Filed Oct. 8, 1937
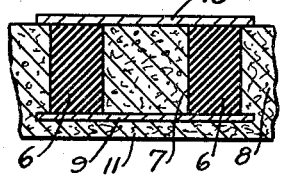
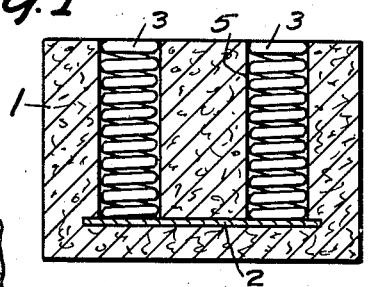
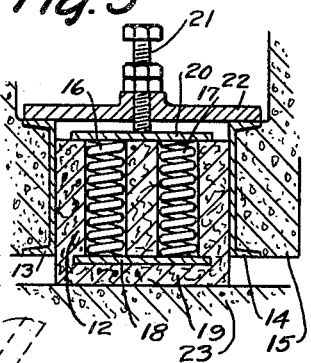
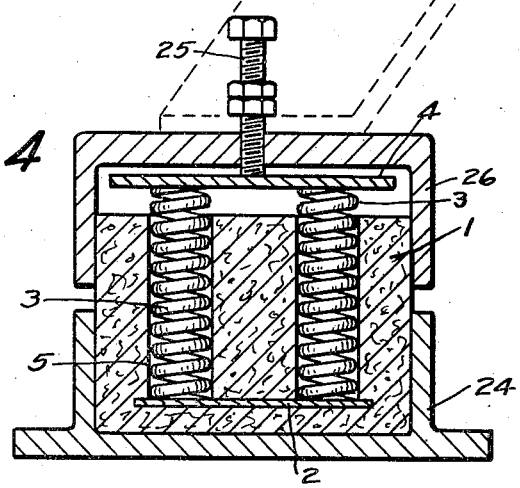
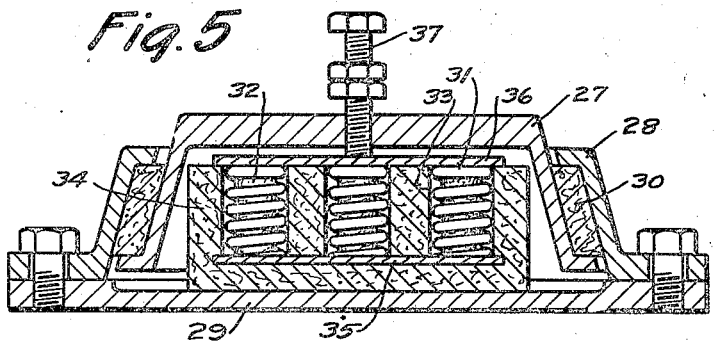
INVENTOR.
John J. Coyne
BY James Harrison Bowen
ATTORNEY.

Patented Feb. 6, 1940

2,189,708

UNITED STATES PATENT OFFICE 2,189,708

VIBRATION ISOLATOR

John J. Coyne, Forest Hills, Long Island, N. Y.

Application October 8, 1937, Serial No. 168,048

4 Claims. (Cl. 248—21)

The purpose of this invention is to provide an improved construction particularly for isolating vibration of machinery or other devices, and which may also be used as a panel for isolating vibrations or sound for any purpose.

The invention is the combination of cork or a similar material with springs, in which the springs are held in openings in the cork, and the resiliency of the springs is combined with that of the cork to improve the isolation of vibrations and sound.

Cork and similar materials have been combined with springs, and springs have been placed upon cork, and also positioned in casings surrounded with and insulated by cork, but the springs are generally mounted between steel plates, and the resiliency of the spring is transmitted to the cork through metal, and, with this construction, the vibrations are positively transmitted through the material of the springs, and the plates to the base through relatively thin layers of cork upon which the plates and springs are mounted, and, therefore, it has been found desirable to surround the springs with cork or similar material, and extend the cork upward until it is engaged by the plate resting upon the upper ends of the springs, thereby providing a substance around the springs for absorbing the vibrations from the plate resting thereon, and thereby holding the vibration in the relatively small area in which the springs are positioned.

The object of this invention is, therefore, to provide means for checking vibrations being transmitted through springs in vibration isolating devices.

Another object is to provide resilient means in addition to the springs for engaging a plate normally positioned on top of springs of vibration isolating devices.

Another object is to provide a block of material positioned in combination with springs against which a plate, resting upon the upper ends of the springs, may bear to supplement the resiliency of the springs.

A further object is to provide means for filling the open area around springs in vibration isolating devices which also absorbs or reduces the vibrations.

A still further object is to provide any combination of cork or other similar material with openings therein, having resilient material therein for isolating vibration by the combination of the two materials.

And a still further object is to provide means for substantially filling all open areas in a vibration isolating unit, in which the filling means cooperates with resilient members therein, which is of a simple and economical construction.

With these ends in view the invention embodies a vibration isolating unit consisting of a slab of cork or similar material having openings therein, with resilient members in said openings resting upon a plate for spreading the load also incorporated in said slab, and another plate engaging the upper ends of the said resilient members, and also the upper surface of the slab.

Other features and advantages of the invention will appear from the following description taken in connection with the drawing, wherein:

Figure 1 is a section showing a typical unit or construction, illustrating a layer of cork or similar material having resilient members in the form of springs in openings therein, and resting upon a bearing plate.

Figure 2 is a similar section showing the springs replaced by rubber or other resilient material.

Figure 3 is a section showing the unit incorporated in a structural footing as may be used for foundations of machinery.

Figure 4 is a cross section showing an alternate design, in which the unit shown in Figure 1 is incorporated in a casing having a base and cap.

Figure 5 is a similar section showing another alternate design, in which the unit is incorporated in a casing of a different type, and also in which the openings or cores inside of the springs are also filled with cork or other similar material.

In the drawing the device is shown as it may be made, wherein numeral 1 indicates a slab of cork or other similar material which may be round, square, or of any shape, or which may also be provided in flat slabs, numeral 2 indicates a bearing plate at the base of the resilient units, and numeral 3, springs in openings in the slab.

Units of this type are now in use as shown in Figures 3, 4 and 5, with springs resting upon bearing plates, and with relatively thin cork plates under the bearing plates, thereby partially isolating vibration by the resiliency of the springs, however, the springs transmit vibration to the bearing plates, and what isolation there is is in the relatively thin cork slab between the bearing plate and base. These slabs are normally mounted in units with upper plates 4 in caps, as shown in Figure 4, resting upon the springs, and the plates are moved downward by screws in the caps or covers to adjust the tension on the springs, whereas, in this design, the cork slab 1 extends upward until it engages the lower surface of the plate 4 when the plate is properly adjusted to the desired tension on the springs or other resilient material in the openings, and, not only takes part of the load, but acts as a steadying force, supplementing the springs, and therefore, absorbs or isolates vibration from the plate.

In the design shown in Figure 1, the slab is provided with openings 5 in which the springs or other resilient material may be placed, and in adjusting the tension on the springs they are compressed to the position shown in Figure 1, with their upper ends corresponding with the upper surface of the slab 1.

Although springs are generally used, it may be desirable to use rubber or any other resilient material as indicated by the numeral 6 in the openings 7 in a slab 8, as shown in Figure 2, and in this design bearing plates 9 are provided under the resilient material with plates 10 at the upper end corresponding to the plate 4. Another slab 11 is also provided under the plate 9, and this may be of cork or any similar material, and the plates 9 and 10 of this, as well as the other designs may also be made of metal, fibre, or any other material.

In the design shown in Figure 3 a structural unit is illustrated in which a slab 12 is mounted between channels 13 and 14, with the channels in a concrete slab 15, and the slab 12 is provided with openings 16 having springs 17 therein, with the lower ends of the springs resting upon a plate 18 on a slab 19 of cork or any similar material, and at the upper end of the slab 12 is a plate 20 which is held downward by a screw 21 in a cap or cover 22 that may be mounted on the upper ends of the channels.

The slab 19 rests upon a foundation 23, which may be a floor or any rigid or stationary foundation surface. This mounting is particularly adapted as a footing for foundation slabs of motors, generators, or other machinery, and the complete slab may be isolated by layers of cork or similar material.

The design illustrated in Figure 4 is similar to that shown in Figure 1, with the slab 1 mounted in a base 24, and with the plate 4 held by a screw 25 in a cap 26. The springs are shown in a free position, and it will be understood that, in adjusting the tension of the springs of the device for use, the screw 25 is turned downward until the plate 4 engages the upper surface of the slab 1.

The mounting shown in Figure 5 is also similar, except that a cap or cover 27 is isolated from a flange 28 of a base 29 by a ring 30 or cork or other suitable material; and, in this design, the openings or cores in the centers of the springs 31 are filled with plugs 32 similar to corks, which may be of cork or any suitable material, and, in this design, the springs 31 are mounted in openings 33 in a slab 34 with a bearing plate 35 similar to the plate 2, and an upper plate 36 similar to the plate 4 held downward by a screw 37 similar to the screw 25. It will be understood that the resilient cores or fillers in the springs shown in Figure 5 may also be used in the springs shown in the other designs, and any other material may be used for completely filling all openings in and around the springs or other resilient members.

It will be understood that other changes may be made in the construction without departing from the spirit of the invention. One of which changes may be in the shape, design or arrangement of any of the parts, as it is understood that the drawings illustrate a few typical designs only, another change may be in the use of any number of springs or resilient members in a slab in proportion to the width or length thereof, another may be in the use of other means for distributing the load of the resilient members, and still another may be in the use of other means for enclosing or mounting the said units in order to distribute the load through the resilient members and slab with the pressure equalized to such an extent that vibrations are substantially isolated.

The construction will be readily understood from the foregoing description. In use the device may be provided in separate units and supplied and used as such, or may be designed and built for special purposes, and the slabs of cork or other material may be provided in sheets or small units with the openings extending downward to the bearing plates, and then the resilient members may be inserted and forced downward by upper plates until the said upper plates engage the upper surface of the slab, substantially as shown and described. It will be understood, therefore, that this device may be used under the feet of machinery, or as continuous slabs for isolating a foundation, or as a floor, wall or partition, and also that these units may be used in combination with other isolating devices as may be desired.

Having thus fully described the invention, what I claim as new, and desire to secure by Letters Patent, is:

1. A vibration isolating unit of the type having a base and a cover, with a relatively large area in the interior between the base and cover, with the cover spaced from and also isolated from the base, a relatively thick slab of resilient material with wells therein substantially filling the open area between the base and cover inside of said isolating unit, a plurality of spring members freely mounted in the wells in the slab of resilient material and perpendicularly positioned between bearing plates, with one plate upon which the spring members rest embedded in the slab and the other positioned above the said slab and vertically movable in relation to the slab and spring members, said unit characterized in that the wells in the slab of resilient material in which the said spring members are freely mounted extend upward from said embedded plate, preventing buckling and lateral movement of said spring members, and also in that the upper surface of the slab extends upward to a point corresponding with the position of the said movable bearing plate with the spring members compressed under load, thereby assisting said spring members in taking the load and absorbing lateral and other vibrations of said spring members and movable bearing plate, said spring members extending upward above the upper surface of the slab when in the free position and adapted to be compressed under load until the movable bearing plate engages the upper surface of the slab.

2. A vibration isolating unit, as described in claim 1, further characterized by inner resilient fillers within said spring members also assisting said spring members in taking the load, and also assisting in preventing buckling of said spring members.

3. A vibration isolating unit, as described in claim 1, further characterized in that the resilient slab of material isolating the said embedded bearing plate is mounted upon a stationary base, and the said slab of resilient material with the wells for the springs therein is slidably mounted between structural members adapted to form a slab to be suspended by said unit, with the said structural members positioned upon said unit by an adjusting screw resting upon said movable bearing plate.

4. A vibration isolating unit, of the type having a split housing with a top and base spaced apart, and a relatively large area therebetween, comprising a plurality of resilient members positioned between bearing plates within the housing, with one plate relatively stationary and the other vertically adjustable, and with the stationary plate completely isolated from direct contact with the housing, a relatively thick slab of resilient material in which the stationary plate is embedded and which forms the isolating means therefor; said unit characterized in that the slab of resilient material has wells therein in which the said resilient members are freely mounted, said slab of resilient material with the wells therein surrounding said resilient members filling the open area inside of said isolating unit, preventing buckling and lateral movement of said resilient members, and also extending to a point corresponding with the position of the adjustable bearing plate with the resilient members under load, thereby assisting said resilient members in taking the load and absorbing lateral and other vibrations of said adjustable bearing plate.

JOHN J. COYNE.